(12) United States Patent
Zinjuwadia et al.

(10) Patent No.: US 8,432,914 B2
(45) Date of Patent: Apr. 30, 2013

(54) METHOD FOR OPTIMIZING A NETWORK PREFIX-LIST SEARCH

(75) Inventors: Kalpesh Zinjuwadia, San Jose, CA (US); Srikanth Rao, Fremont, CA (US)

(73) Assignee: Force 10 Networks, Inc., San Jose, CA (US)

( * ) Notice: Subject to any disclaimer, the term of this patent is extended or adjusted under 35 U.S.C. 154(b) by 242 days.

(21) Appl. No.: 12/951,276

(22) Filed: Nov. 22, 2010

(65) Prior Publication Data

US 2012/0127997 A1    May 24, 2012

(51) Int. Cl.
*H04L 12/56* (2006.01)
(52) U.S. Cl.
USPC .............. 370/392; 370/408; 706/47; 709/202
(58) Field of Classification Search .................. 370/392, 370/408; 706/47; 709/202
See application file for complete search history.

(56) References Cited

U.S. PATENT DOCUMENTS

| | | | |
|---|---|---|---|
| 5,251,205 A | | 10/1993 | Callon et al. |
| 6,061,712 A | * | 5/2000 | Tzeng ........................... 709/202 |
| 7,386,525 B2 | * | 6/2008 | Nurmela et al. ................. 706/47 |
| 2002/0133586 A1 | * | 9/2002 | Shanklin et al. ............... 709/224 |
| 2003/0051165 A1 | * | 3/2003 | Krishnan et al. ............... 713/201 |
| 2005/0198382 A1 | | 9/2005 | Salmi et al. |
| 2007/0008888 A1 | * | 1/2007 | Chawla et al. ................. 370/230 |
| 2008/0267200 A1 | | 10/2008 | Berkovich et al. |
| 2009/0316698 A1 | * | 12/2009 | Menten .......................... 370/392 |

* cited by examiner

*Primary Examiner* — Dang Ton
*Assistant Examiner* — Mewale Ambaye
(74) *Attorney, Agent, or Firm* — Haynes and Boone, LLP

(57) ABSTRACT

A packet network device includes a route processor that operates to maintain one or more forwarding tables and it includes one or more line cards that operate to process information received by the packet network device from the network and to forward the information to its correct destination. The route processor also operates to identify which incoming prefixes can be used to update the forwarding tables or to identify prefixes stored in the packet network device that can be redistributed from one network protocol to another network protocol running on the route processor. A table management function running on the route processor operates to identify the best match between an incoming prefix and information included in policy statement associated with both an ordered prefix-list and a radix tree structure.

18 Claims, 7 Drawing Sheets

COMMUNICATION NETWORK 10

FIG. 2A

IP ADDRESS 20

| 1ST OCTET | 2ND OCTET | 3RD OCTET | 4TH OCTET |

1ST SECTION — 2ND SECTION

FIG. 2B

PREFIX PAIR 21

XXX . XXX . XXX . XXX / N

FIG. 3

POLICY STATEMENT 30

(PERMIT/DENY)   (IP PREFIX/PREFIX LENGTH)   (PREFIX RANGE)

FIG. 4

IP PREFIX-LIST 40

```
ip prefix-list match-nlri
  seq 10 permit 10.10.10.0/24
  seq 15 deny   10.10.10.0/24 gt 30
  seq 20 permit 10.10.20.0/24 le 26
  seq 25 permit 10.20.20.0/24 gt 26
  seq 30 deny   10.20.30.0/24 le 28
  seq 35 deny   10.10.0.0/16 le 32
  seq 40 deny   10.20.0.0/16
  seq 45 deny   any
```

RADIX TREE 50

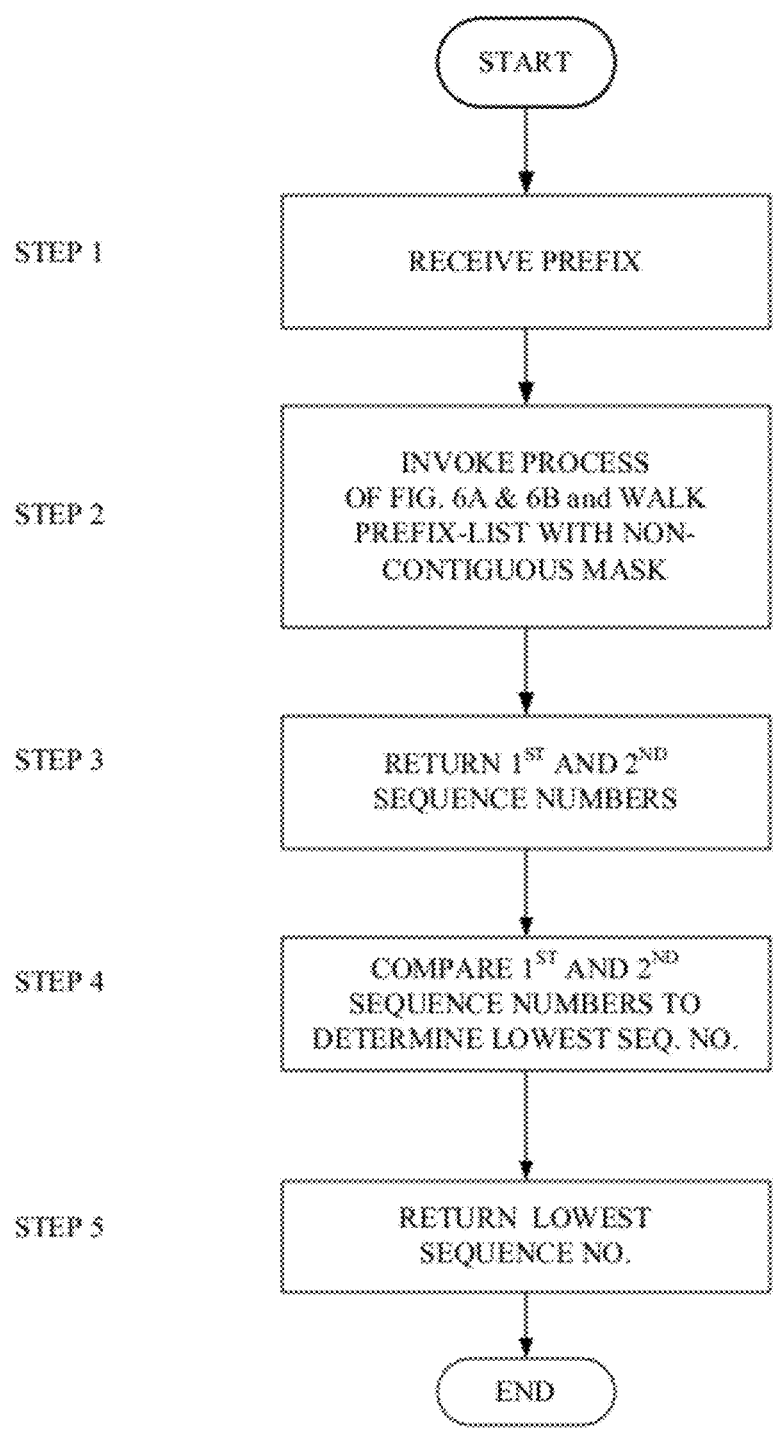

METHOD FOR OPTIMIZING A NETWORK PREFIX-LIST SEARCH

BACKGROUND

1. Field of the Invention

The present disclosure relates generally to efficient processes for the filtering of IP packet prefixes and more specifically to an efficient process for identifying which Internet Protocol prefixes are stored in a RIB maintained by a network protocol.

2. Description of Related Art

Large communication networks are typically comprised of multiple autonomous systems that are administered by a single organization or entity, and each autonomous system can include multiple sub-networks or subnets each of which is a distinct, logical part of the autonomous system. Each subnet can include some number of packet network devices such as routers and/or switches and some number of host devices such as servers and/or clients that cooperate to transport information from one location to another location in the network. In order to transport information from one location to another in a network, such as the Internet, an IP address is pre-pended to each transmitted packet or frame of information. This IP address is divided into a network portion or network prefix and a host portion, with the network prefix portion occupying the N (N being a number from 1 to 32 for IPv4) most significant bits of the address and with the host portion occupying the N least significant bits of the address. The network portion of the IP address is used by routers or switches to determine to which portion of the network (subnet) a packet or frame with a particular network prefix is sent, and the host portion is used by the routers or switches to determine to which particular host (server or client) the packet is sent.

In order to operate within a network to forward information to the correct destination, packet network devices learn reachability information from other packet network devices with which they can communicate. This information can include, among other things, the network prefix information of the surrounding network devices. This network prefix information is typically learned by a network protocol running on a packet network device. Any particular network device can include one or more network protocols such as the open shortest path first (OSPF) protocol, the border gateway protocol (BGP), the routing information protocol (RIP) to name only three. This network reachability information is then employed by the various network protocols to build a routing information base (RIB) which a routing table manager can use to build a common forwarding information base (FIB).

In addition to being used to build RIBs and FIBs, network prefixes can be used to define policies which are employed by a packet network device to accept or deny packets it receives from other areas of the network in which it is located or from other protocols as the result of route redistribution. More specifically, prefixes can be used to filter incoming and outgoing network update information used by network protocols such as BGP and OSPF, and prefixes can be used to control the redistribution of routing information from one network protocol to another, such as between OSPF and RIP or between OSPF and BGP, whether the different protocols are running on the same network device or on different network devices. IP prefixes used as described above can be included in a sequential list of statements which a network protocol can sequentially walk from the first statement to the last statement looking for a match between a recently received prefix (redistributed or network address update) and information included in the statement. When the network protocol determines that there is a match between a recently received prefix and information in a statement in the prefix-list, the recently received prefix is either permitted or denied. This process is typically referred to as prefix filtering. If the prefix is permitted, the protocol can use the prefix to, among other things, update a routing or forwarding table. A recently received packet in this context can be a packet that is received from another network device or from another network protocol.

One problem with the sequential prefix-list based approach to prefix filtering is that the performance of the network device starts to degrade as the size of the prefix list increases. When the number of statements in a sequentially ordered prefix list becomes large, which can be on the order of twenty-thousand statements for example, and a match is performed for a large number of prefixes (500,000 or more as can be the case with an Internet feed), the amount of time it takes a network device to update its routing and forwarding tables increases to an unacceptable level.

SUMMARY

It was found that an ordered list of prefix-list statements can be organized into a radix tree structure in order to significantly decrease the amount of time it takes to match update IP prefix information to information included in the statements in the radix tree. In one embodiment, a method is disclosed for identifying an IP prefix that is used by a network protocol running on a packet network device to update a forwarding table wherein a plurality of prefix-list statements are defined for inclusion into an ordered list, the nodes and sub-nodes of a radix tree structure are populated with at least some of the information included in the prefix-list statements, one or more network protocols running on the packet network device receive update IP prefix information and compare this received information with information included in the radix tree, and a forwarding table is updated with the received IP prefix information if it matches information in the radix tree.

BRIEF DESCRIPTION OF THE DRAWINGS

The present invention can be best understood by reading the specification with reference to the following figures, in which:

FIG. 2A is an illustration showing the format of an IP address.

FIG. 2B is an illustration showing the format of an IP routing prefix.

FIG. 3 is a diagram showing the format for a policy statement included in a prefix-list.

FIG. 4 is a illustration showing the format of a prefix-list.

FIG. 7 is a logical flow diagram of an alternative embodiment of a process for matching update prefix with prefix information included in a radix tree.

DETAILED DESCRIPTION

Figure 1A:
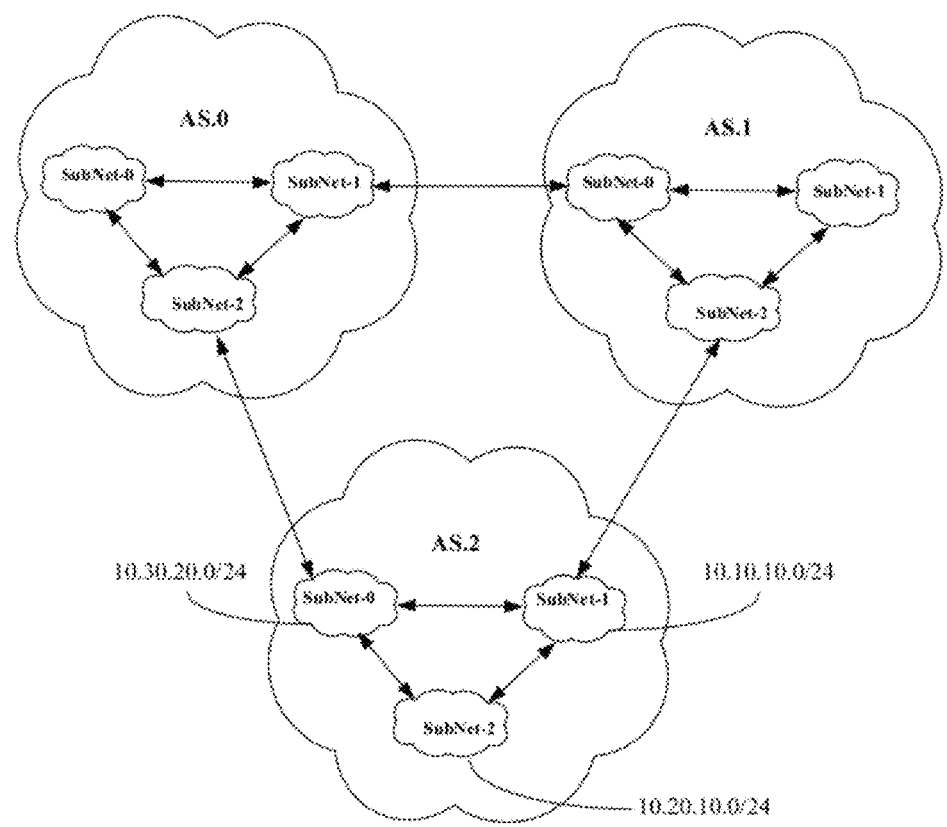
FIG. 1 is a diagram of communications network 10.

A communication network, such as the Internet, includes a large number of autonomous systems (AS) each of which can include some number of interconnected sub-networks. As described earlier, an AS can include a plurality of network devices that are administered by a single organization or entity, and each autonomous system can include multiple sub-networks or subnets each of which is a distinct, logical part of the autonomous system. Generally, all of the packet network devices (routers/switches) comprising the subnet are addressable using a common IP network address, which is typically referred to as a subnet address or IP network prefix. FIG. 1A is a diagram of a communications network 10 which can operate according to the well known Internet Protocol (IP). The network 10 includes, in this case, three autonomous systems, AS.0, AS.1 and AS.2, each of which are in turn comprised of some number of SubNets labeled Subnet-0 to SubNet-2 for each of the autonomous systems. All of the packet network devices (routers and/or switches) in each of the SubNets in all of the autonomous systems are addressable by a unique SubNet address which is typically referred to as a network prefix or IP prefix in this case as the network 10 is operating according to the Internet Protocol.

Continuing to refer to FIG. 1A, each of the SubNets (0-2) in AS.2 are assigned unique IP prefixes by a central authority such as the Internet Network Information Center (INIC). For the purpose of this description, each IP prefix is represented in dotted decimal format as an IP prefix address/prefix length pair (prefix pair). For the purpose of this description, SubNet-0 is assigned prefix 10.30.20.0/24, SubNet-1 is assigned prefix 10.10.10.0/24 and SubNet-2 is assigned prefix 10.20.10.0/24. The format and content of an IP address and IP prefix will be describe later with reference to FIGS. 2A and 2B respectively.

Figure 1B:
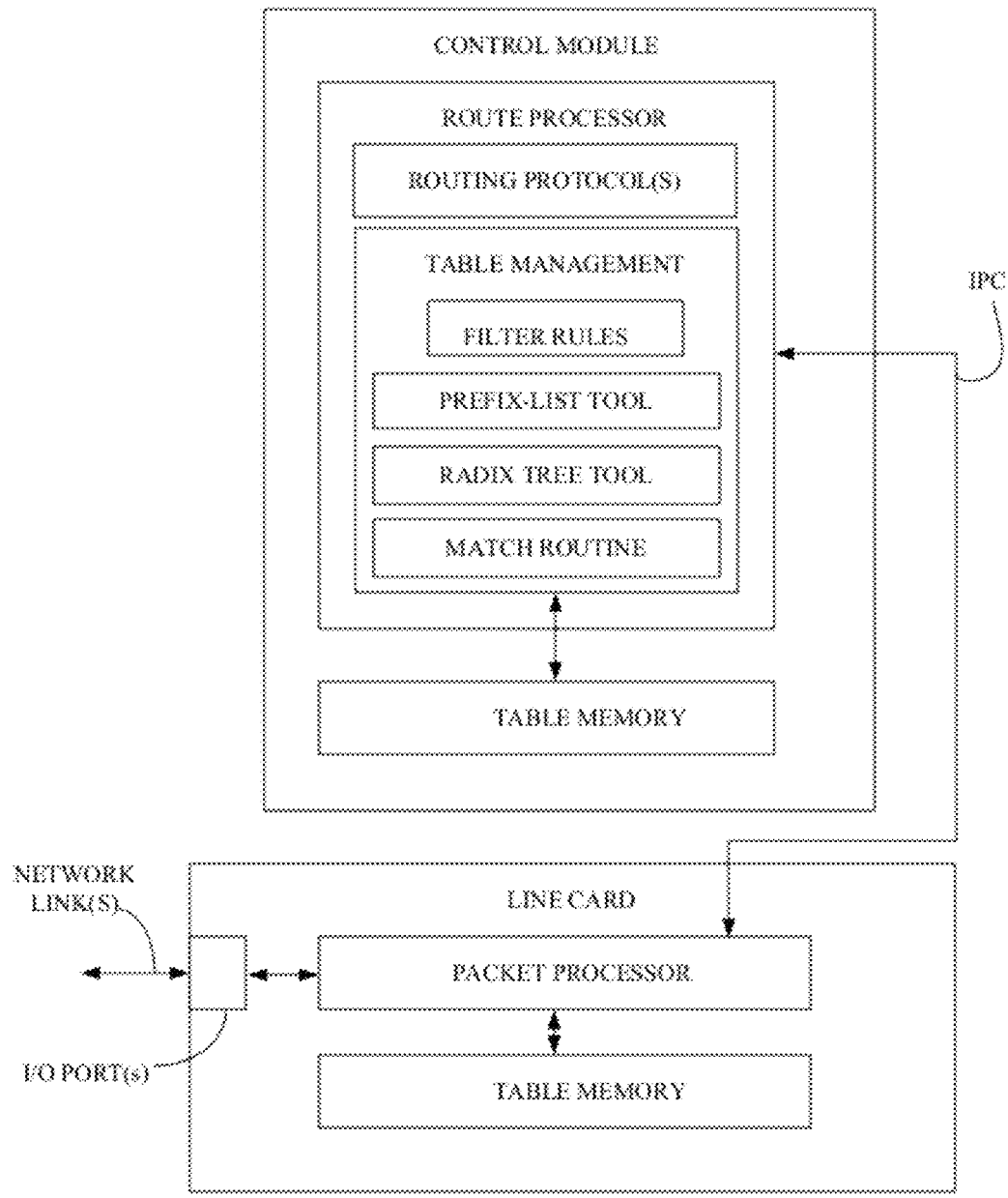

FIG. 1B is a block diagram showing functionality that can comprise a packet network device 15 such as a network router or switch according to one embodiment. The network device 15 is, among other things, comprised of a control processor and one or more line cards. The line cards generally operate to receive and transmit information to and from a network to which the network device 15 is connected over one or more I/O ports, and the line cards operate to process the information received from the network to determine how and where to forward the information. Each line card includes packet processing functionality and a forwarding table that enable it to perform the information forwarding functionality. The control processor generally operates to, among other things, maintain the forwarding table included in each of the line cards, and the control processor operates according to one embodiment to control which routes are included in the forwarding tables maintained in the line cards and to control which IP addresses are redistributed between network protocols running on the packet network device 14. In this regard, the control processor includes at least one route processor module that is comprised of at least one network protocol and a table management module and it includes memory. The network protocols can include one or more of the following well known network protocols, the Internet Protocol, the Open Shortest Path First (OSPF) protocol, the Border Gateway Protocol (BGP), the Routing Information Protocol (RIP), the Address Resolution Protocol (ARP) to name only a few. The control module memory can be used to store, among other things, routing information gathered by the network protocols that the table management modules can use to build and maintain the forwarding tables on the line cards.

Continuing to refer to FIG. 1B, the table management module is comprised of one or more IP prefix filter policies, a prefix-list development tool, a radix tree development tool, and a match routine. Generally, the filter policies operate to control which prefixes received by the network device 15 are permitted or denied to the network protocols for the purpose of updating routing and forwarding tables or are permitted or denied for redistribution between the network protocols. The prefix-list development and the radix tree development tools can be used by a network administrator to build/compile prefix-lists and to build radix trees as will be described later with reference to FIG. 4 and FIG. 5 respectively. The match routine generally operates to walk a radix tree to identify a best match for an incoming prefix pair to information included in the radix tree.

FIG. 2A is a diagram illustrating the general format of an IPv4 address 20. According to IPv4, each IP address is comprised of 32 bits of information divided into two variable length sections. A first section is reserved for a network address and a second section is reserved for a host address. In the case of the three prefixes assigned to the three SubNets comprising AS.2, the first 24 bits of each address includes IP prefix information, which is specified in each of the prefixes by the /24 notation. The /24 notation in this case refers to a subnet mask length or simply the length of the subnet address. Depending upon the size of the network, the IP address can be in any one of three primary classes, with a different number of lower order bits being reserved for network address information. However, for the purpose of this description, the class of the IP address is not important and so will not be discussed further. As shown in FIG. 2A, and according to the three IP prefixes described above, the first section of the IP address in this case is comprised of the lower order twenty four bits which are included in the 1st, 2nd and 3rd octets of the address, and the second section of the IP address is comprised of the eight higher order bits which are included in the 4th octet of the IP address.

Although a prefix address in the IPv4 format is described here, the prefix address can also be in the IPv6 format.

FIG. 2B illustrates the format of an IP prefix 21 in dotted decimal form. The IP prefix 21 illustrated in this case is an IPv4 address, and so it includes thirty two bits of address information divided evenly among four, eight bit octets. The IP prefix 21 can be one bit in length or it can be 24 bits in length, and each IP prefix can be expressed as a prefix/length pair, with a first member of the pair being the IP prefix and a second member of the pair being the prefix length. The second member of the pair is separated from the first member of the pair by a As described earlier in the background section, network prefixes can be used to define policies which are employed by a packet network device to accept or deny packets it receives from other areas of the network (other autonomous systems for instance) in which it is located, or from other protocols as the result of route redistribution. FIG. 3 shows the format for such a policy statement 30 which can be stored in the control module memory located in device 15 described with reference to FIG. 1B. The policy statement of FIG. 3 is comprised of three fields, but can include more or fewer fields. The first field includes a permit or deny instruction, the second field includes the IP prefix address/prefix length pair, and the third field includes prefix range information. A policy statement, such as the statement shown in FIG. 3, can be used to filter incoming and outgoing network update information used by network protocols such as BGP and OSPF, and they can be used to control the redistribution of routing information from one network protocol to another, such as between OSPF and RIP or between OSPF and BGP, whether the different protocols are running on the same network device or on different network devices. A statement, similar in format to the one described above, can be included in a sequential list which a network protocol can sequentially walk, from the first statement to the last statement, looking for a match between a recently received prefix (redistributed or network address update) and information included in the statement. When the network protocol determines that there is a match between a recently received prefix and information in a statement in the prefix-list, the recently received prefix is either permitted or denied. This process is typically referred to as prefix filtering. If the prefix is permitted, the protocol can use the prefix to, among other things, update a routing or forwarding table. A recently received packet in this context can be a packet that is received from another network device or from another network protocol.

FIG. 4 is an illustration showing a prefix-list 40 comprised of eight sequentially organized policy statements, or simply statements, which can be stored in the control module memory described with reference to FIG. 1B. All of the statements in this case include contiguous mask information, but a prefix-list, similar to prefix-list 40, can include non-contiguous sub-net mask information. Typically, each statement in a prefix-list is generated by a network administrator, and each list can be built to meet the routing or switching requirements allowed by a network administrator for each packet network device (this is determined by the source of a flow and the destination of a flow) in which the list is implemented/build/included. Router and switch vendors typically provide proprietary tools to customers that can be used to generate statements and to build a prefix-list. The design and operation of such tools are well known to those in the field of router/switch design and so will not be described here. The prefix-list 40 is strategically build to be sequentially walked starting at the first statement. A router can include filter function that operates to sequentially test each new prefix it receives against information included in each of the statements and immediately stops testing at the point that there is a match. At the point that there is a match, an action corresponding to conditions specified in the matching statement (permit or deny) is taken and the testing process is terminated. More specifically with respect to FIG. 4, the first statement in the prefix-list 40 is labeled "seq 10" and it includes the a policy to permit any route to a destination with the IP prefix 10.10.10.0 that is twenty four bits in length. The second statement labeled "seq 15" includes a policy to deny any route to a destination with an IP prefix 10.10.10.0 that is twenty four bits in length. The range term "gt 30" in this case is used to match an incoming prefix to a statement during a match procedure. So, for example, an incoming IP prefix pair 10.10.10.0/32 is permitted by this statement because the prefix length of thirty two matches the range in the statement which is greater than thirty. The third statement labeled "seq 20" includes a policy to permit routes to a destination with IP prefix 10.10.20.0 in which the prefix length is twenty four to twenty six bits inclusive, and the last statement labeled "seq 45" includes a policy to deny routes to any destination with a prefix that does not match any of the policies in the preceding statements.

As was described in the background section, a prefix-list, such as the list 40 of FIG. 4, can include twenty thousand statements, in which case the process of walking the list to match incoming prefixes to information included in a statement comprising the list can take an unacceptably long period of time. It was discovered that statements comprising a sequential list of statement can be placed into a radix tree structure in a manner that permits a router to very quickly match incoming prefix information with information included in a statement comprising a prefix-list, such as the prefix-list 40 of FIG. 4. In the event that there is a match, the IP prefix address information included in the matched statement can be used to update a routing or forwarding table included in a packet network device, or the IP prefix address information included in the matched statement can be used to determine which IP prefixes are redistributed between network protocols.

Figure 5:
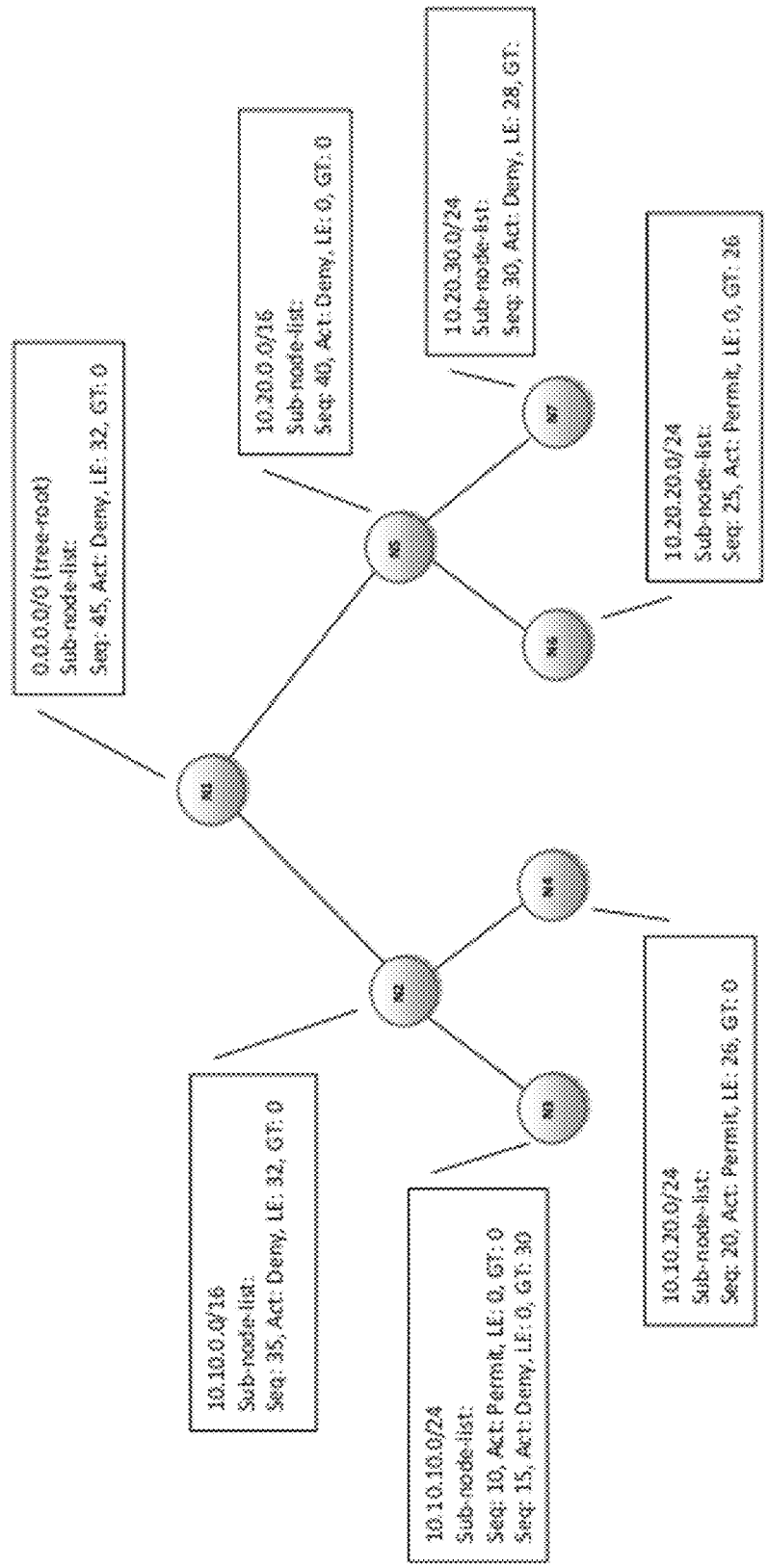
FIG. 5 is an illustration showing a radix tree populated with information included in the prefix-list of FIG. 4.

FIG. 5 illustrates a radix tree structure 50 (stored in control module memory of FIG. 1B) comprised of the statements described with reference to FIG. 4. The radix tree is comprised of seven nodes, N1 to N7, with each of the nodes corresponding to one or more of the statements in the prefix-list 40 of FIG. 4. Each of the nodes, N1-N7, include a match key, which in one embodiment is the IP prefix address/prefix length pair (or simply prefix pair) described earlier with reference to FIG. 2B. Since multiple statements can include the same prefix address/prefix length pair information but different information can be included in the remaining portion of the statement, each node, N1-N7, can be associated with one or more distinct sub-nodes. Each sub-node includes at least some of the other information comprising a statement, such as the sequence number, statement action (permit/deny) and prefix range information (gt or le). For example, in FIG. 5, node N3 includes two sub-nodes (SN10 and SN15) corresponding to the two sequences 10 and 15 in the prefix-list 40 of FIG. 4. Both sequence 10 and sequence 15 include the same prefix address, namely 10.10.10.0/24, but the rest of the information in the statement is different, and so the sequence number the action and the range information included in the corresponding statement is included in the respective sub-nodes. In the case of radix tree structure of FIG. 5, information associated with each sub-node is included in a separate entry in a sub-node list, so that SN10 and SN15 are both included in the sub-node list associated with node N3. The radix tree 50 can be build the tree nodes and sub-nodes populated with prefix-list information using proprietary router/switch vendor tools. The design and operation of such tools are well known to practitioners in this field and so will not be described here.

Continuing to refer to FIG. 5, node N1 is the root node of the radix tree 50, and it includes the prefix address/prefix length pair 0.0.0.0/0 which is the default route. Node N1 is associated with only one sub-node, SN45 in this case, which is comprised of information included in the statement labeled sequence 45 in the prefix-list 40 of FIG. 4. In the case of node N1, any prefix arriving at the network device that includes the radix table 50 will be determined to be a match with node N1, as the prefix 0.0.0.0/0 is the default route and matches all the prefixes. Node N1 is connected to two branch nodes, nodes N2 and N5. In operation, assuming an incoming prefix of 10.10.10.1/32, the packet network device can examine the state of one or more bits in this prefix, and starting at node N1, compare this state with the state of corresponding bits in a statement key, which in this case is the prefix address/prefix length pair included in each node of the radix tree. Depending upon which bits are set, either the left (node N2) or right (node N5) is selected. This process of walking the radix tree to match incoming prefix information to statement key information continues until the network device finds the best matching node. Then, at this point, the process performs a backtrack operation looking for a sub-node that has the lowest sequence number. This process for identifying incoming or outgoing prefix information that is permitted or denied is computationally very efficient. In the worst case scenario, given an IPv4 prefix address, the best prefix match process only performs thirty two iterations before it identifies a match or not.

FIG. 6 is a logical flow diagram of a process that can be employed to determine whether to permit or deny a prefix that is either received during a network discovery/reachability operation (ARP) or sent during a prefix redistribution operation. For the purpose of describing an embodiment the process, the radix tree structure 50 of FIG. 5 is used and it is assumed that the prefix that is either received or sent is 10.10.10.0 and that it is 24 bits long (10.10.10.0/24). In step 1 of the process, the radix tree 50 of FIG. 5 is build using the information included in the prefix-list 40 of FIG. 4. As previously described, packet network device vendors typically supply proprietary tools that device users can employ to generate policy statements that are included in a prefix-list and to build a radix tree structure from the information comprising the prefix-list. In Step 1A, a default sequence number is selected/pre-selected and stored packet network device memory, such as the table memory included in the control module of the packet network device 15 described with reference to FIG. 1B. In Step 2, the packet network device either receives a prefix that can be used to update a routing or forwarding table or it is instructed to redistribute one or more prefixes of which the prefix 10.10.10.0/24 is one. Regardless, the packet network device (a network protocol running on the device) in Step 3 invokes a routine "Radix-Get-Best" which walks down the radix tree 40 using the prefix 10.10.10.0/24 as a search key. The Radix-Get-Best routine can be a sub-routine included in the match routine described earlier with reference to FIG. 1B. Specifically, Radix-Get-Best compares the search key information (prefix pair) to the information included at each node in the radix tree starting with the root node and each subsequent node in one path of the radix tree structure. In this case, the prefix 10.10.10.0/24 is compared to node N1, node N2 and node N3 and the routine determines that the information included in the statement in node N3 is the best match and in Step 4 returns the identity of this node, or node N3 in this case.

Figure 6A:
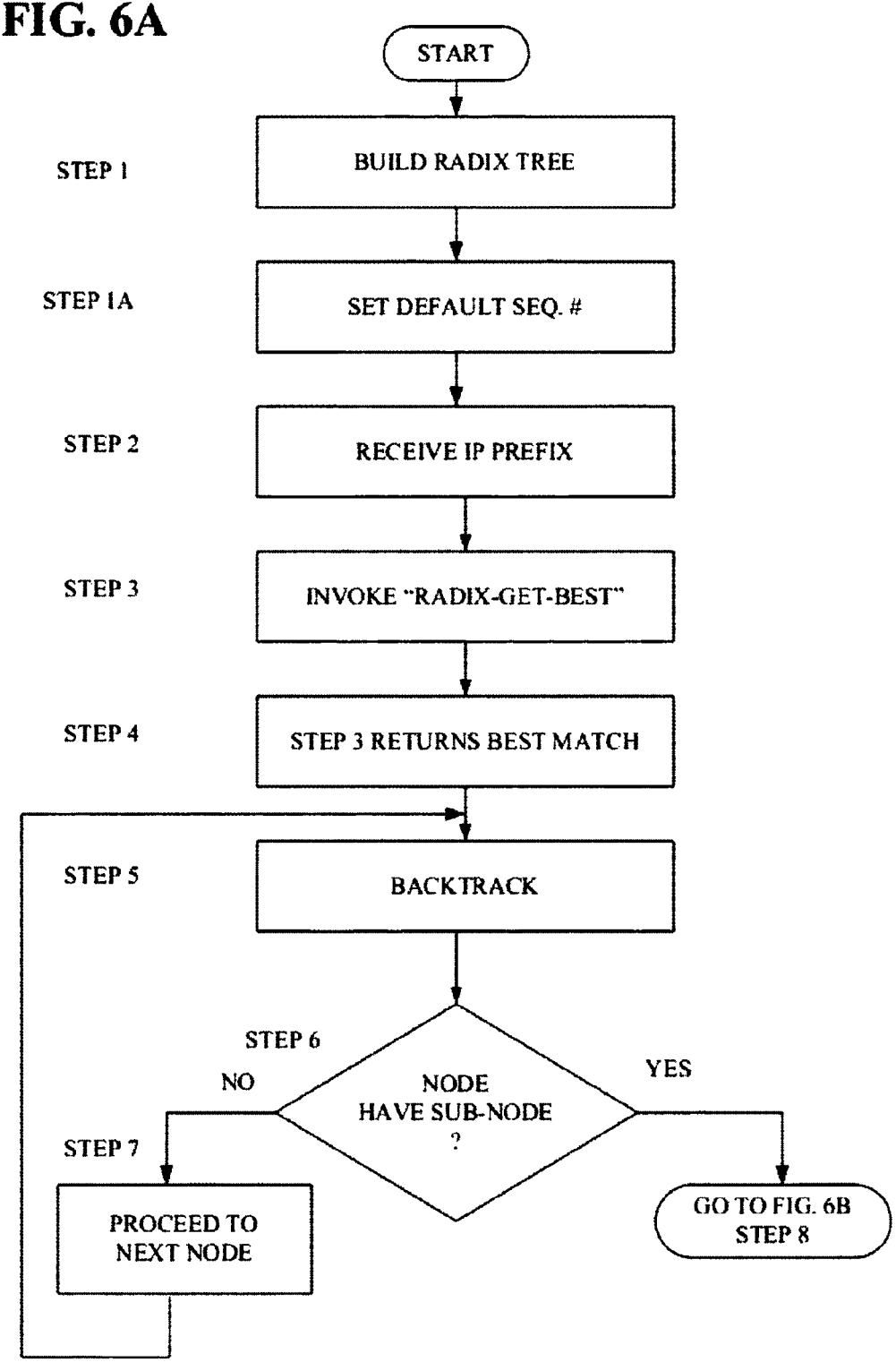
FIG. 6 is a logical flow diagram of one embodiment of a process for matching an update prefix with prefix information included in a radix tree.
Figure 6B:
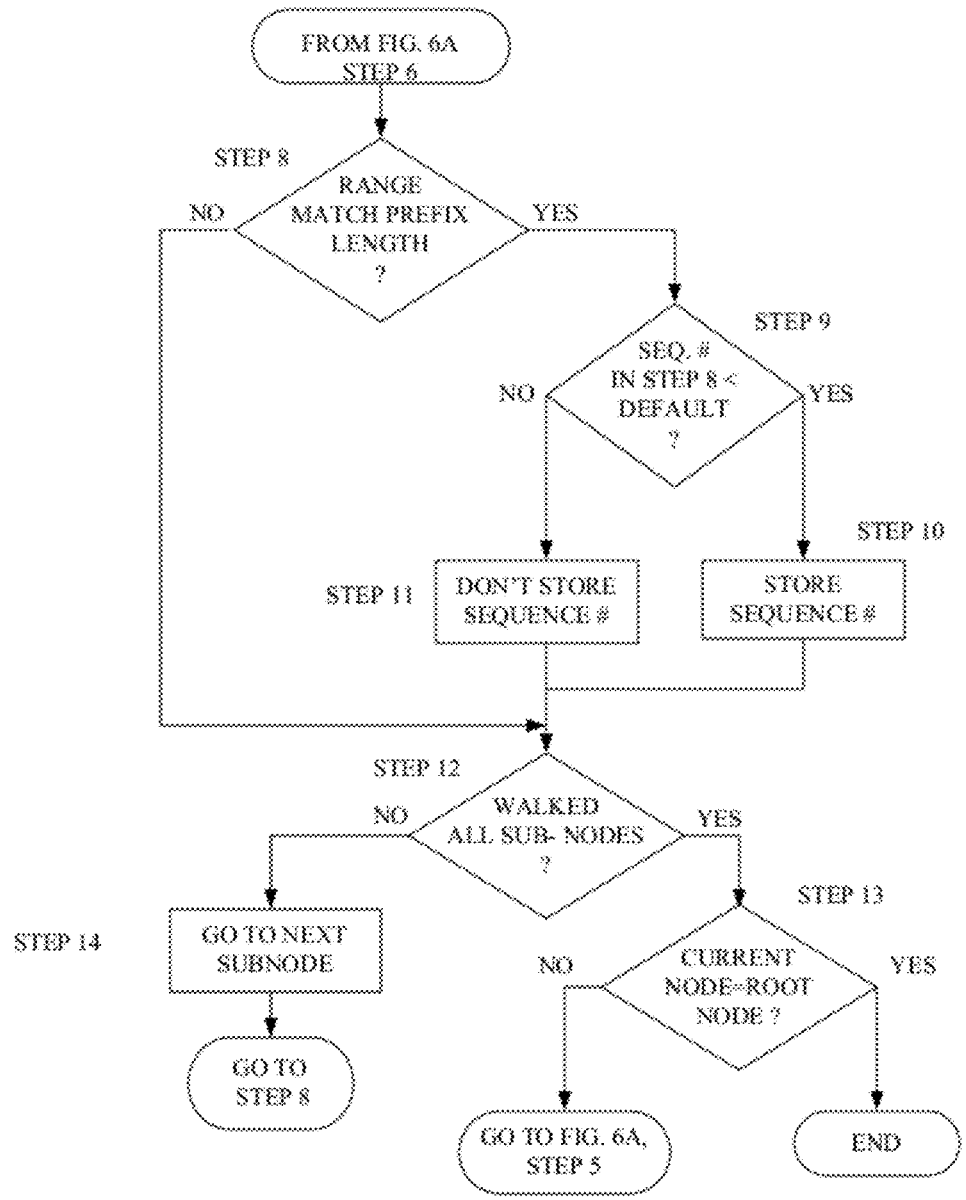

Continuing to refer to FIG. 6, in Step 5 the Radix-Get-Best routine proceeds to perform a backtrack operation through the sub-nodes of the radix tree structure (along the path that the Radix-Get-Best routine followed) to compare the range information included in each of the sub-nodes with the range information included in the prefix pair 10.10.10.0/24. Starting with the sub-node list associated with node N3, which has two sub-nodes SN10 and SN15, if in Step 6 the routine determines that one or more sub-nodes are associated with node N3, then the process proceeds to Step 8, otherwise the process proceeds to Step 7 where it performs the backtrack operation to the next node in the radix tree structure. In Step 8 if the routine determines that the prefix length information in the sub-node (SN10) associated with the statement labeled sequence 10 matches the prefix length information in the received prefix, or 24, the process proceeds to Step 9. On the other hand, if in Step 8 the routine determines that there is no match, then the process proceeds to Step 12 where the routine determines whether the list of sub-nodes comprising the current node have been walked or not, and if not the process returns back to Step 5 in FIG. 6A, otherwise the process terminates. In Step 9 the sequence number identified in Step 8 is compared to the pre-selected sequence number stored in memory (this is a sequence number with a maximum value or that is larger than any of the sequence numbers in the radix tree) in Step 1A, and if the sequence number identified in Step 8 is less than the pre-selected sequence number, then the process proceeds to Step 10 and the sequence number is stored. In this case, the stored sequence number is 10. On the other hand, if the sequence number identified in Step 8 is greater than the pre-selected sequence number (this would not occur at this point because none of the sequence numbers in the radix tree are greater than the pre-selected sequence number), then in Step 11 the sequence number is not stored and the process proceeds to Step 12 where a determination is made by the routine whether or not the backtracking operation has examined all of the sub-nodes in the current node of the radix tree structure. If it has, then the process proceeds to Step 13 where a determination is made whether or not he current node is the root node of the radix tree structure. If the current node is the root node, then the process ends, otherwise the proceed returns to Step 5 and the backtrack operation moves to the next node, N2. On the other hand, if in Step 12 the process determines that not all of the sub-nodes in the list of sub-nodes in the current node have been walked, then in step 14 the next sub-node in the list is examined and the process returns back to Step 8. Although the process determines that there is a match between the prefix pair 10.10.10.0/24 and the information included in the sub-node associated with the statement labeled sequence 35, it determines that the sequence number associated with this sub-node is higher than the stored sequence number and so sequence number 35 is not stored. The process continues to backtrack up the radix tree until it reaches the root node, and if the routine does not determine that there is a sub-node associated with a sequence number that is less than 10, then it determines that sub-node SN10 of node N3 is the best match. In this case, the prefix is permitted as is the policy associated with the statement labeled sequence 10.

Although the radix tree based approach operates very efficiently to permit or deny prefixes based on matches to contiguous mask information, this approach does not support matching an incoming IP prefix to non-contiguous mask information included in a statement. Specifically, since the radix tree approach described as above is designed to sequentially evaluate each bit in an IP prefix, from the lowest to the highest order bit, against corresponding prefix bits in a radix tree node (the evaluation is a comparison of the state of each bit), the radix tree method cannot be employed to evaluate an incoming prefix against a statement that includes non-contiguous mask information. If it is the case that statements, against which an incoming prefix is to be evaluated, includes non-contiguous mask information, then these statements are included in an ordered prefix-list as opposed to being included in a radix tree structure. This prefix-list is build in the same manner as the prefix-list described with reference to FIG. 4. This prefix-list is comprised of sequentially ordered statements that can be employed by the sequential matching technique described with respect to FIG. 4 to identify a policy that best matches an incoming prefix. FIG. 7 is a logical flow diagram of an embodiment of a process for identifying the best match between an incoming prefix and information included in an ordered prefix list that includes at least one statement with non-contiguous mask information, and the best match between the incoming prefix and information included in a radix tree structure which only includes contiguous mask information.

Referring to FIG. 7, a packet network device receives an incoming prefix in Step 1 and in Step 2 the match routine, included the packet network device 15 of FIG. 1B, proceeds to evaluate the prefix against statements included in an ordered prefix-list, such as the prefix-list described in FIG. 4, looking for the best match, and, at the same time or serially, the match routine evaluates the prefix against information included a radix tree (see description relating to FIGS. 6A and 6B) again looking for the best match. The ordered prefix-list includes at least one statement with non-contiguous prefix mask information and the radix tree structure, among other things, only includes contiguous prefix mask information. In Step 3, the match routine returns a first sequence number, which is the lowest sequence number associated with the best match to a statement in the prefix-list, and it returns a second sequence number, which is the lowest sequence number associated with the best match to a statement in the radix tree. Then, in Step 4, the match routine compares the first and second sequence numbers identified as the result of Step 3 in order to identify the lowest of the two sequence numbers, and in Step 5, the match routine returns the lowest of the first and second sequence numbers as the best match between the incoming prefix and the information in both the ordered prefix-list and the radix tree structure. Depending upon the permit or deny instruction included in the lowest identified sequence number, the prefix can be used to update a routing or forwarding table or the prefix can be redistributed from one network protocol to another.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. Although the embodiments are described in the context of IPv4, these embodiments can also operate on prefixes formatted according to the IPv6 standard. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method for updating a forwarding table in a packet network device, comprising:
    defining a first plurality of routing policies for inclusion into a first sequentially numbered list of routing policies;
    defining a second plurality of routing policies for inclusion into an ordered prefix list that includes a second sequentially numbered list of routing policies, at least some of the second plurality of routing policies including a non-contiguous IP prefix mask;
    building a radix tree structure with information included in the first sequentially numbered list of routing policies;
    using IP prefix information included in an IP prefix to search the radix tree structure to identify a lowest sequence number routing policy in the radix tree structure that best matches the IP prefix information;
    using the IP prefix information in the IP prefix to search the ordered prefix list to identify a lowest sequence number routing policy in the ordered prefix list that best matches the IP prefix information;
    comparing the lowest sequence number routing policy in the ordered prefix list with the lowest sequence number routing policy in the radix tree structure to identify a routing policy with the overall lowest sequence number; and
    updating the forwarding table with the IP prefix information if the routing policy with the overall lowest sequence number includes an instruction to permit the IP prefix.

2. The method of claim 1, wherein a route is discovered by a network protocol.

3. The method of claim 1, wherein each of the first plurality of routing policies are comprised of contiguous sub-net mask information.

4. The method of claim 1, wherein each of the second plurality of routing policies are comprised of non-contiguous mask information.

5. The method of claim 1, wherein the first sequentially number list of routing policies is an IP prefix-list.

6. The method of claim 1, wherein the ordered prefix list is an IP prefix-list.

7. The method of claim 1, wherein the first plurality of routing policies is comprised of a permit/deny portion and a IP prefix pair portion.

8. The method of claim 7, wherein the first plurality of routing policies includes an IP prefix range portion.

9. The method of claim 1, wherein the radix tree structure is comprised of nodes that include IP prefix-pair information and sub-nodes that include a sequence number and a permit/deny portion.

10. The method of claim 9, wherein the sub-nodes in the radix tree structure including a prefix range.

11. The method of claim 9, wherein searching the radix tree structure to identify a lowest sequence number routing policy in the radix tree structure that best matches the IP prefix information includes:
    searching the radix tree structure until a best match between the IP prefix information and a routing policy in the radix tree is identified; and
    starting at the identified routing policy, backtracking up the radix tree structure to identify the lowest sequence number routing policy in the radix tree structure that best matches the IP prefix information.

12. A packet network device, comprising:
    one or more line cards each of which are comprised of one or more input/output ports, a packet processor and a line card memory, the line card memory including at least one forwarding table with information that the packet processor uses to forward packets received by the line card; and
    a control module comprised of a route processor and a control module memory, the route processor operating to maintain the at least one forwarding table on the one or more line cards and the control module memory used to store a radix tree structure that includes first sequentially numbered list of routing policies and an ordered prefix list that includes a second sequentially numbered list of routing policies, at least some of the second sequentially numbered list of routing policies including a non-contiguous mask information; wherein the route processor operates to:
        use IP prefix information in an IP prefix to search the radix tree structure to identify a lowest sequence number routing policy in the radix tree structure that best matches the IP prefix information;
        uses the IP prefix information in the IP prefix to search the ordered prefix list to identify a lowest sequence number routing policy in the ordered prefix list that best matches the IP prefix information;
        compare the lowest sequence number routing policy in the ordered prefix list with the lowest sequence number routing policy in the radix tree structure to identify a routing policy with the overall lowest sequence number; and
        update the at least one forwarding table with the IP prefix information if the routing policy with the overall lowest sequence number includes an instruction to permit the IP prefix.

13. The packet network device of claim 12, wherein each of the routing policies in the first sequentially numbered list of routing policies includes contiguous sub-net mask information.

14. The packet network device of claim 12, wherein each of the routing policies in the second sequentially numbered list of routing policies includes non-contiguous mask information.

15. The packet network device of claim 12, wherein the first sequentially numbered list of routing policies is an IP prefix-list.

16. The packet network device of claim 12, wherein the second sequentially numbered list of routing policies is an IP prefix-list.

17. The packet network device of claim 12, wherein the radix tree structure is comprised of nodes that include IP prefix-pair information and sub-nodes that include a sequence number and a permit/deny portion and prefix range information.

18. The packet network device of claim 12, wherein the route processor operates to search the radix tree structure until a best match between the IP prefix information and a routing policy in the radix tree structure is identified, and,
    starting at the identified routing policy statement, performs a backtrack operation on the radix tree structure to identify the lowest sequence number routing policy in the radix tree structure that best matches the IP prefix information.

\* \* \* \* \*